(12) United States Patent
Gohl (10) Patent No.: US 8,704,877 B2
(45) Date of Patent: Apr. 22, 2014

(54) SYSTEMS AND METHODS FOR PRESENTING THREE-DIMENSIONAL CONTENT USING APERTURES

(75) Inventor: Mark Gohl, Yorkshire (GB)

(73) Assignee: Eldon Technology Limited, Keighley (GB)

( * ) Notice: Subject to any disclaimer, the term of this patent is extended or adjusted under 35 U.S.C. 154(b) by 682 days.

(21) Appl. No.: 12/697,460

(22) Filed: Feb. 1, 2010

(65) Prior Publication Data
US 2011/0187825 A1 Aug. 4, 2011

(51) Int. Cl.
*H04N 13/02* (2006.01)
(52) U.S. Cl.
USPC ............................................................ 348/46
(58) Field of Classification Search
USPC .......... 345/102, 204, 419; 348/47, 51, 54, 59, 348/E13.001, E13.02, E13.021, E13.025, 348/E13.028, E13.03; 359/463, 464
IPC ...................................................... H04N 13/04
See application file for complete search history.

(56) References Cited

U.S. PATENT DOCUMENTS

| | | |
|---|---|---|
| 5,883,739 A | 3/1999 | Ashihara et al. |
| 5,969,850 A | 10/1999 | Harrold et al. |
| 6,476,850 B1 | 11/2002 | Erbey |
| 2004/0008251 A1* | 1/2004 | Mashitani et al. ............... 348/51 |
| 2004/0263970 A1* | 12/2004 | McKee, Jr. ...................... 359/463 |
| 2006/0203335 A1* | 9/2006 | Martin et al. ................... 359/462 |
| 2008/0143895 A1* | 6/2008 | Peterka et al. ................... 349/15 |

FOREIGN PATENT DOCUMENTS

EP 0726482 A2 8/1996

OTHER PUBLICATIONS

European Patent Office, International Searching Authority, "International Search Report" mailed Mar. 21, 2011; International Patent Appln. No. PCT/EP2011/051418, filed Feb. 1, 2011.

* cited by examiner

*Primary Examiner* — Jay Patel
*Assistant Examiner* — Neil Mikeska
(74) *Attorney, Agent, or Firm* — Ingrassia Fisher & Lorenz, P.C.

(57) ABSTRACT

Systems and methods are presented for presenting three-dimensional video content to one or more viewers. In an exemplary embodiment, a system comprises a display comprising a plurality of pixels, an opaque material interposed in a line-of-sight between the display and the viewer, and a processor coupled to the display. The opaque material comprises a plurality of apertures formed therein. The processor and the display are cooperatively configured to display right channel content on a first subset of the plurality of pixels that are viewable by a right eye of the viewer through the apertures and display left channel content on a second subset of the plurality of pixels that are viewable by a left eye of the viewer through the apertures.

20 Claims, 6 Drawing Sheets

SYSTEMS AND METHODS FOR PRESENTING THREE-DIMENSIONAL CONTENT USING APERTURES

TECHNICAL FIELD

The following discussion generally relates to the presentation of three-dimensional (3D) imagery, and more particularly, three-dimensional video.

BACKGROUND

Three-dimensional imagery may be achieved by presenting content that is resolved into separate images by a viewer's left and right eyes. When the two separate images are received simultaneously, the viewer perceives a three-dimensional image by fusing the images received by the left and right eyes and using parallax to achieve depth perception.

It is desirable to provide three-dimensional video using televisions and other display technologies conventionally used to present two-dimensional images and/or video due to the ubiquity of such displays. Many techniques rely on viewing instruments (e.g., glasses, goggles, headsets, or the like) that are worn by viewers to perceive three-dimensional images and/or video. However, this typically requires that each prospective viewer owns or otherwise has access to the appropriate viewing instrument to view the content in 3D. Additionally, some viewers may find these viewing instruments to be uncomfortable, unfashionable, or otherwise distracting. Accordingly, it is desirable to provide three-dimensional video using televisions and other display technologies without requiring the use of viewing instruments.

BRIEF SUMMARY

According to various exemplary embodiments, systems and methods are presented for presenting three-dimensional video content to one or more viewers. In an exemplary embodiment, a system comprises a display comprising a plurality of pixels, an aperture arrangement interposed in a line-of-sight between the display and the viewer, and a processor coupled to the display. The aperture arrangement comprises a plurality of apertures. The processor and the display are cooperatively configured to display right channel content on a first subset of the plurality of pixels that are viewable by a right eye of the viewer through the apertures and display left channel content on a second subset of the plurality of pixels that are viewable by a left eye of the viewer through the apertures.

In other embodiments, a system for presenting three-dimensional video content is provided. The three-dimensional video content comprises a first plurality of frames corresponding to a first eye and a second plurality of frames corresponding to a second eye. The system suitably comprises a display comprising a plurality of pixels, an aperture arrangement disposed proximate the display, and a processor coupled to the display. The processor is configured to determine a first subset of the plurality of pixels that are aligned with a first eye through the aperture arrangement and determine a second subset of the plurality of pixels that are aligned with a second eye through the aperture arrangement. The first plurality of frames are displayed on the first subset of pixels and the second plurality of frames are displayed on the second subset of pixels.

Still other embodiments relate to a method of presenting three-dimensional video content comprising a first plurality of frames corresponding to a first channel and a second plurality of frames corresponding to a second channel. The method suitably comprises identifying a first subset of pixels of a display that are aligned with a first eye of a viewer through an aperture arrangement, identifying a second subset of pixels of the display that are aligned with a second eye of the viewer through the aperture arrangement, displaying the first plurality of frames on the first subset of pixels, and displaying the second plurality of frames on the second subset of pixels.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Technologies and concepts discussed herein relate to systems and methods for presenting three-dimensional ("3D" or "3-D") imagery to a viewer. An aperture arrangement comprising a plurality of aperture-like features is placed at the front of a display in a line-of-sight between the display and a viewer. As described in greater detail below, depending on the embodiment, the aperture-like features may be realized as physical openings or voids in the structure of the aperture arrangement or as a transparent portion of the aperture arrangement. Accordingly, for convenience, but without limitation, the term "aperture" is used herein to refer to any transparent feature (e.g., a physical opening or a transparent portion) of the aperture arrangement that is interposed between opaque features to permit viewing of pixels of the display that are aligned with an eye of a viewer through the aperture. As used herein, a pixel aligns with an eye of a viewer when an aperture is in a line-of-sight between the pixel and that eye of the viewer, such that the pixel is viewable by that eye of the viewer through the aperture. For example, a pixel is aligned with a right eye of a viewer when it is viewable by the right eye of the viewer through an aperture.

As described in greater detail below, pixels of the display are selected to align with apertures of the aperture arrangement and thereby allow a viewer to perceive different sets of imagery through the left and right eyes, creating a stereoscopic effect. The aperture arrangement allows the viewer's left and right eyes to perceive separate pixels of the display, thereby allowing the display to present separate images to each of the viewer's eyes. Content designated for the right eye of the viewer is presented using a first subset of pixels aligned with the right eye of the viewer and content designated for the left eye is concurrently presented using a second subset of pixels aligned with the left eye of the viewer. The subsets of pixels are mutually exclusive such that content designated for the left eye is not presented using pixels that are aligned with the right eye and content designated for the right eye is not presented using pixels aligned with the left eye. Parallax between the content designated for the right eye and the content designated for the left eye results in the viewer perceiving depth, thereby producing a three-dimensional image.

Figure 1:
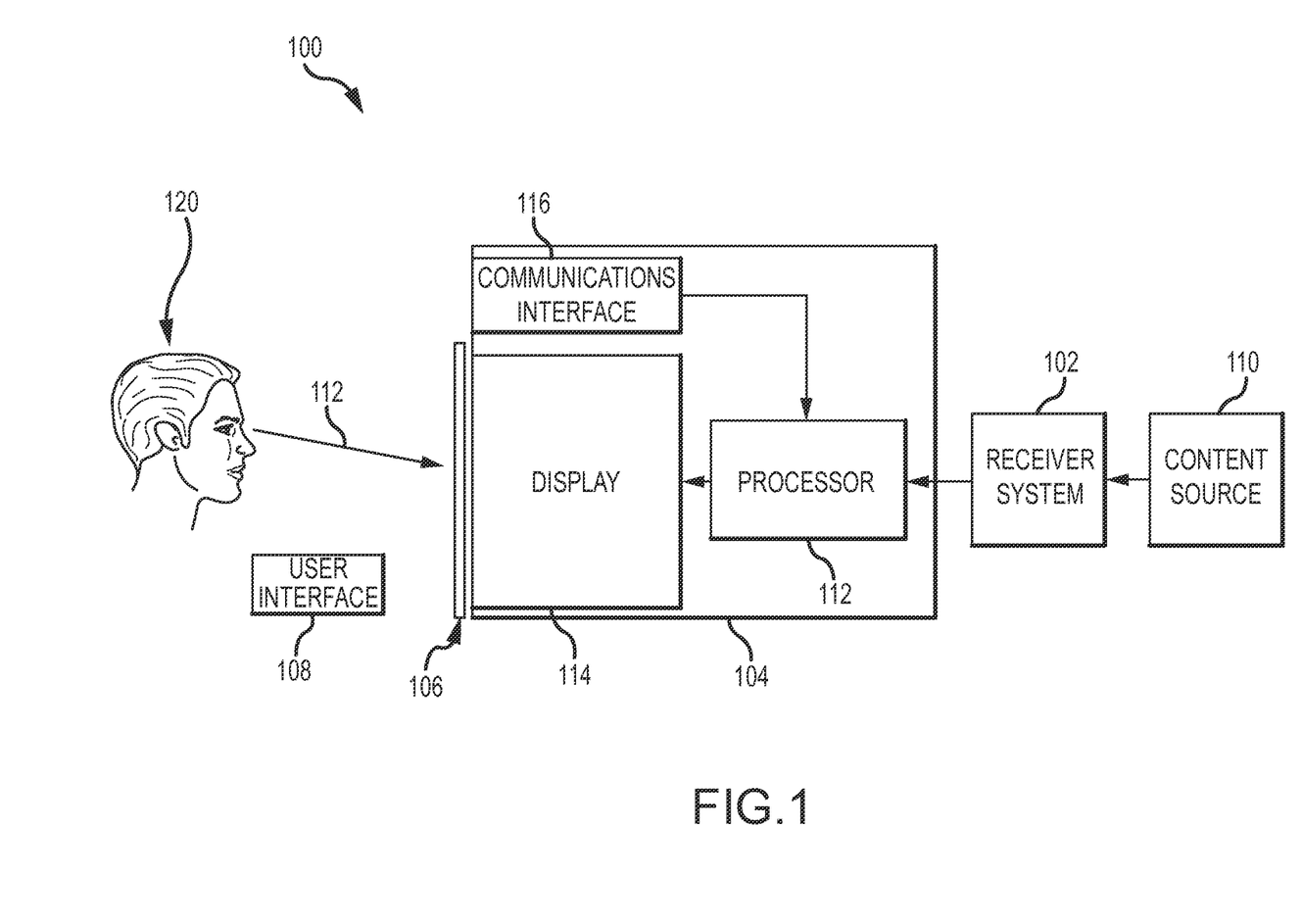
FIG. 1 is a block diagram of an exemplary system for presenting three-dimensional content.

Referring now to FIG. 1, in an exemplary embodiment, a system 100 for presenting three-dimensional content suitably includes a receiver system 102, a display system 104, and an aperture arrangement 106. The aperture arrangement 106 comprises a number of apertures that permit separate viewing of two discrete images that are simultaneously presented by the display system 104, that is, a right eye of a viewer may view a first image through the aperture arrangement 106 while a left eye of a viewer concurrently views a second image through the aperture arrangement 106. In an exemplary embodiment, the system 100 includes a user interface 108 configured to interact with the display system 104 and facilitate configuration of the display system 104 for use with the aperture arrangement 106, as described in greater detail below in the context of FIG. 6.

The receiver system 102 generally represents the devices, components, circuitry and/or logic capable of receiving and processing video content from a content source 110. The content source 110 may provide video content to the receiver system 102 over any sort of broadcast or other distribution channel, such as, for example, broadcast television, very small aperture terminal (VSAT) satellite (e.g., for movie distribution), direct broadcast satellite (DBS), cable television, cellular or other wireless telephone networks, Internet or other data communications networks, physical media, and/or another suitable avenue for delivering content.

In an exemplary embodiment, the video content provided by the content source 110 is encoded or otherwise configured for stereoscopic imaging and includes a right channel and a left channel. The right channel comprises content (e.g., frames or images) designated or otherwise encoded for the right eye of a prospective viewer and the left channel comprises content (e.g., frames or images) designated or otherwise encoded for the left eye of a prospective viewer. For example, the right channel may include video frames or images captured by a first camera and the left channel may include video frames or images captured by a second camera positioned to the left of the first camera, resulting in parallax between the right channel and the left channel. Thus, when a viewer perceives the right channel content with his or her right eye and the left channel content with his or her left eye at the same time, the parallax results in the viewer perceiving depth, thereby producing a three-dimensional image.

The display system 104 is coupled to the receiver system 102 and configured to present images and/or video corresponding to the content received by the receiver system 102 from the content source 110. In the illustrated embodiment, the display system 104 includes a processor 112, a display 114, and a communications interface 116 configured to interact with the user interface 108. The display 114 comprises a plurality of pixels configured to present images under control of the processor 112. In this regard, the display 114 may be realized as a rasterized display wherein the pixels are organized in a grid-like arrangement. Depending on the embodiment, the display 114 may be realized as any sort of television, monitor and/or other display capable of presenting images and/or video to a viewer under control of the processor 112.

In an exemplary embodiment, the aperture arrangement 106 is interposed in a line-of-sight 118 between the display 114 and a prospective viewer at a viewing position 120. The aperture arrangement 106 includes with appropriate apertures (or transparent portions) interposed between opaque portions of the aperture arrangement 106, wherein the apertures permit separate viewing of two discrete, but simultaneously presented, images on the pixels of the display 114. As described above, an aperture should be understood as referring to a transparent feature of the aperture arrangement 106, and depending on the embodiment, an aperture may be realized as a physical opening or void in the structure of the aperture arrangement 106 or as a transparent portion of the structure of the aperture arrangement 106. For example, in accordance with one or more embodiments, the aperture arrangement 106 is composed of an opaque material having appropriate openings etched or otherwise formed therein. In this regard, the aperture arrangement 106 may be realized as a molded plastic structure or another suitable opaque material having apertures formed therein. In another embodiment, the aperture arrangement 106 may be realized by forming opaque portions in or on a transparent structure, for example, by printing or otherwise imparting opaque markings on the surface of a transparent material, resulting in portions of the transparent material being interposed between opaque features on the surface of the transparent material. In this manner, the portions of the transparent material interposed between opaque features function like apertures by permitting the passage of light between opaque features. In yet another embodiment, the aperture arrangement 106 is realized as a liquid crystal display (LCD) panel, wherein transparent pixels of the LCD panel function like apertures by permitting the passage of light between opaque pixels of the LCD panel.

In the illustrated embodiment of FIG. 1, the aperture arrangement 106 is disposed proximate the viewing surface of the display 114 and oriented parallel to the viewing surface of the display 114, such that the aperture arrangement 106 intersects a viewer's line-of-sight when viewing the display 114. The geometry of the aperture arrangement 106 may be chosen such that the aperture arrangement 106 conforms to the viewing surface of the display 114 to allow the aperture arrangement 106 to achieve a desired proximity to the display 114. For example, when the viewing surface of the display 114 is substantially planar (e.g., a flat screen display), the aperture arrangement 106 is substantially planar, as shown in FIG. 1. In this manner, the aperture arrangement 106 functions as a screen-like structure, wherein the apertures allow light to propagate from the display 114 through the apertures to a viewer. In this regard, the opaque portions of the aperture arrangement 106 limit the number of pixels of the display 114 that are viewable by an eye of a prospective viewer at viewing position 120 to those pixels that a viewable through the apertures, as described in greater detail below. In an exemplary embodiment, the apertures are realized as vertical lines (or vertical slots). In alternative embodiments, the apertures may be realized as diagonal lines (or diagonal slots), arranged in a checkerboard pattern, realized using another suitable arrangement of apertures that prevents an eye of a viewer from being able to view all of the pixels within a horizontal line of pixels of the display 114.

Figure 2:
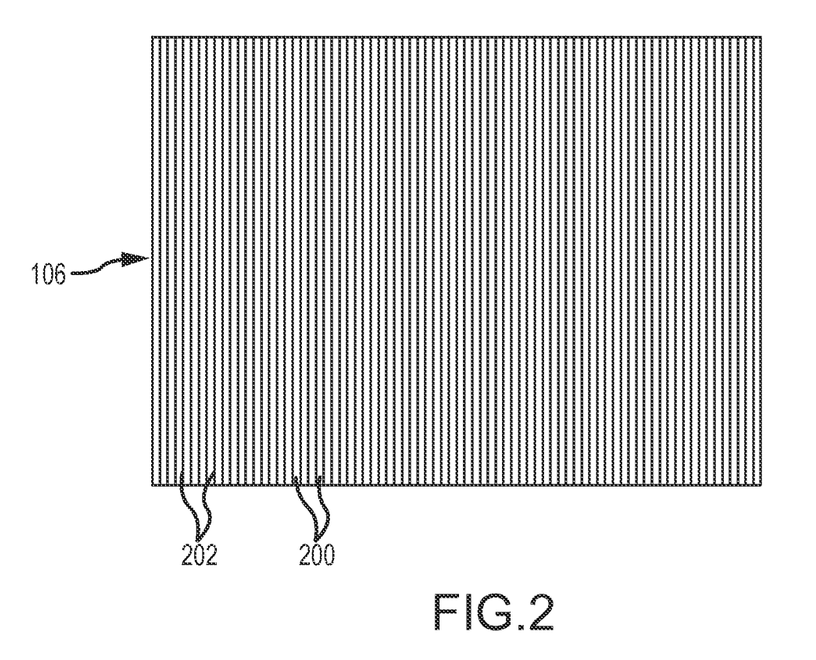
FIG. 2 is a plan view of the exemplary aperture arrangement of FIG. 1.
Figure 3:
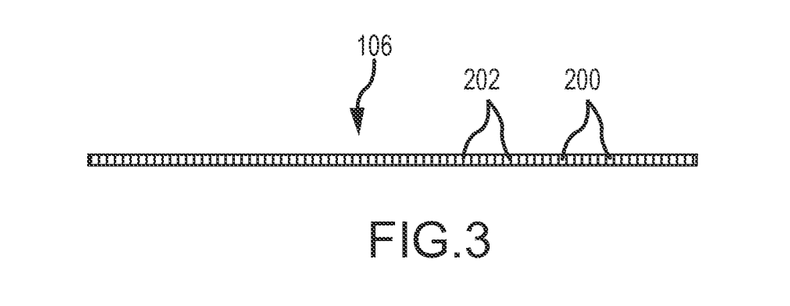
FIG. 3 is a top-down view of the exemplary aperture arrangement of FIG. 1.

FIGS. 2-3 show top and side views, respectively, of an exemplary aperture arrangement 106 that includes a plurality of apertures (or alternatively, transparent portions or transparent features) 200 interposed between opaque features 202. In the illustrated embodiment, the aperture arrangement 106 includes any number of apertures that are realized as vertical slots (or lines) 200 formed in an opaque material 202. In an exemplary embodiment, the vertical slots 200 are uniformly-spaced throughout the aperture arrangement 106, that is, each slot 200 is horizontally-spaced equally from adjacent slots 200. Additionally, the slots 200 may be symmetrical, such that each slot 200 has the same dimensions (e.g., height and width). In other embodiments, the slots 200 may be non-uniform and/or asymmetrical, that is, the slots 200 may have different dimensions and/or may be space irregularly throughout the aperture arrangement 106.

In an exemplary embodiment, the number of vertical slots 200 is less than one half of the number of vertical lines (or columns) of pixels of the display 114 (or alternatively, the number of vertical lines of pixels is at least twice the number of vertical slots) to accommodate stereoscopic imaging for an individual viewer. For example, if the display 114 has 1080 vertical columns of pixels, the aperture arrangement 106 has 540 or fewer vertical slots. The number of apertures and the width of the apertures of the aperture arrangement 106 will dictate the effective resolution of the display 114 by controlling the number of pixels of the display 114 that will be viewable by an individual eye of a viewer. For example, increasing the number of apertures will allow each eye of a viewer to perceive more pixels, and wider apertures (or slots 200) will allow each eye to perceive more pixels and provide a better tolerance for lateral adjustments to the viewer's position. However, as described in greater detail below, in an exemplary embodiment, the aperture arrangement 106 is configured to accommodate a certain number of viewers, such that each eye of each prospective viewer is capable of perceiving a unique (or mutually exclusive) subset of the pixels of the display 114. In this regard, wider apertures may result in overlapping perception of pixels (e.g., a pixel perceived by both eyes of a viewer, or a pixel perceived by an eye of a first viewer and an eye of a second viewer), thereby limiting the number of viewers that the system 100 can accommodate. Thus, in practice, the number of apertures and the dimensions (e.g., the width) of the apertures will vary depending on the desired resolution and the desired number of viewers for a particular application.

Figure 4:
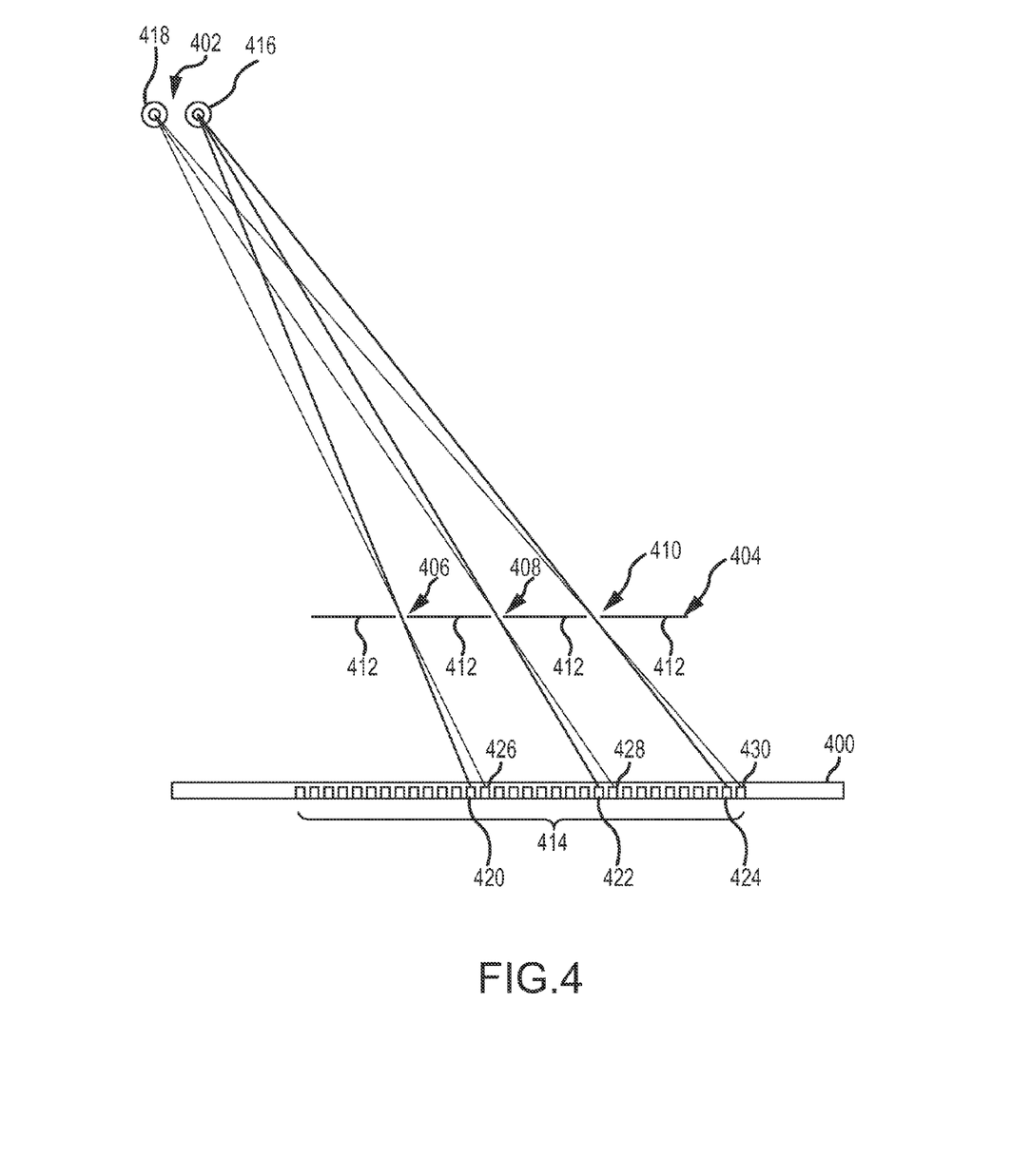
FIG. 4 is a top-down illustration of subsets of pixels of a display that are viewable by the eyes of a viewer from a viewing position in an exemplary embodiment.

FIG. 4 depicts a top-down view of the vertical lines (or columns) of pixels that are viewable by the eyes of a viewer when viewing a display 400 from a viewing position 402 through an aperture arrangement 404 including apertures 406, 408, 410. In the illustrated embodiment, the apertures 406, 408, 410 represent vertical slots formed in an opaque material 412 to limit the pixels 414 of the display 400 that are viewable by the eyes of the viewer. As described above, the number of vertical slots 406, 408, 410 is less than twice the total number of vertical lines of pixels 414 of the display 400. It should be understood that FIG. 4 is a simplified representation of a display and aperture arrangement for purposes of explanation and ease of description, and FIG. 4 is not intended to limit the application or scope of the subject matter in any way. In this regard, although FIG. 4 depicts an aperture arrangement 404 comprising three vertical slots 406, 408, 410 and a display 400 comprising thirty-two vertical lines of pixels 414, in practical embodiments, the number of vertical columns of pixels of the display and/or the number of apertures of the aperture arrangement will vary depending on the needs of a particular application. Accordingly, the subject matter is not limited to any particular number of vertical lines of pixels of the display and/or any particular number of apertures.

As shown in FIG. 4, from the viewing position 402, the left eye 416 of the viewer is capable of perceiving a first vertical column (or line) of pixels 420 through the first vertical slot 406, a second vertical column (or line) of pixels 422 through the second vertical slot 408, and a third vertical column of pixels 424 through the third vertical slot 410. In other words, the first vertical slot 406 is in a line-of-sight between the left eye 416 of the viewer and the first vertical line of pixels 420, the second vertical slot 408 is in a line-of-sight between the left eye 416 and the second vertical line of pixels 422, and the third vertical slot 410 is in a line-of-sight between the left eye 416 and the third vertical line of pixels 424. The right eye 418 of the viewer at viewing position 402 is capable of perceiving a fourth vertical column (or line) of pixels 426 through the first vertical slot 406, a fifth vertical column (or line) of pixels 428 through the second vertical slot 408, and a sixth vertical column of pixels 430 through the third vertical slot 410. In other words, the first vertical slot 406 is in a line-of-sight between the right eye 418 of the viewer and the fourth vertical line of pixels 426, the second vertical slot 408 is in a line-of-sight between the right eye 418 and the fifth vertical line of pixels 428, and the third vertical slot 410 is in a line-of-sight between the right eye 418 and the sixth vertical line of pixels 430. Thus, lines of pixels 426, 428, 430 are aligned with the right eye of the viewer and lines of pixels 420, 422, 424 are aligned with the left eye of the viewer. As described in greater detail below, in an exemplary embodiment, content designated for the right eye (or right channel) is displayed using the subset of pixels 426, 428, 430 of the display 400 that are viewable by the right eye 418 of the viewer while content designated for the left eye (or left channel) is concurrently displayed using the subset of pixels 420, 422, 424 of the display 400 that are viewable by the left eye 416 of the viewer. This concept may be repeated, in some embodiments, for two or more viewers.

Figure 5:
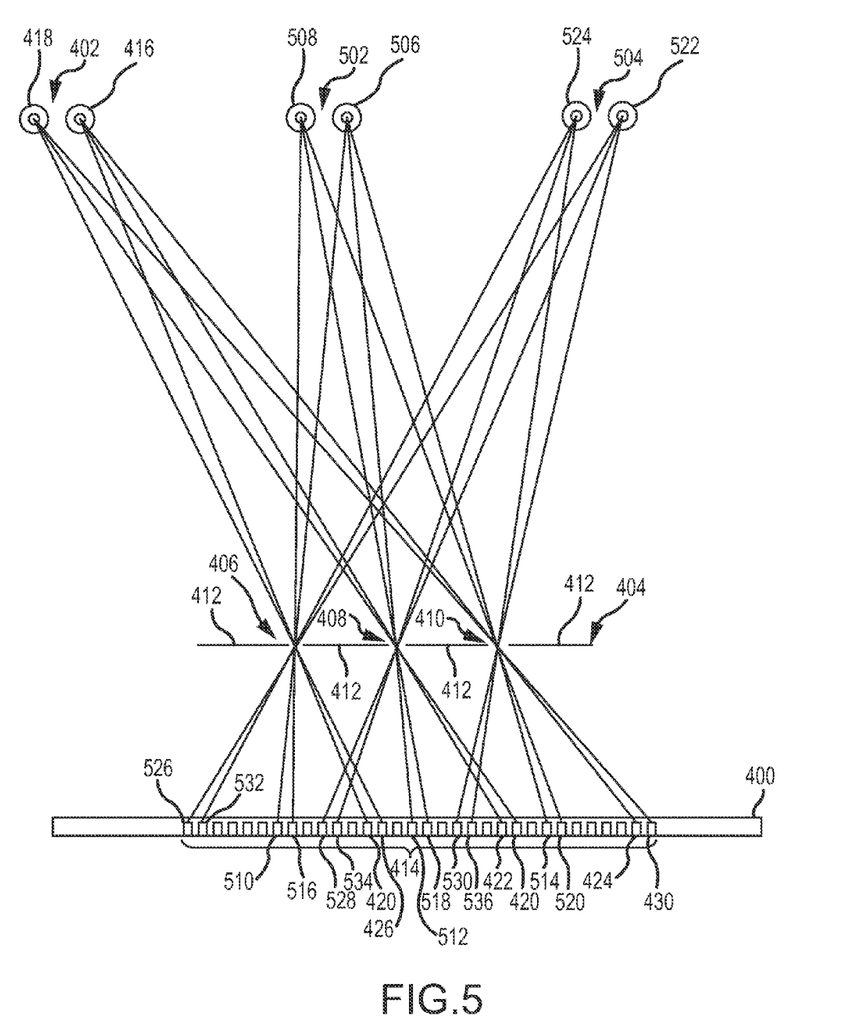
FIG. 5 is a top-down illustration of subsets of pixels of a display that are viewable by the eyes of viewers from multiple viewing positions in an exemplary embodiment.

FIG. 5 depicts a top-down view of the vertical columns (or lines) of pixels that are viewable by the eyes of additional viewers when viewing the display 400 through the aperture arrangement 404 from additional viewing positions 502, 504. From a second viewing position 502, the left eye 506 of a second viewer is capable of perceiving a vertical column (or line) of pixels 510 through the first vertical slot 406, a vertical column (or line) of pixels 512 through the second vertical slot 408, and a vertical column of pixels 514 through the third vertical slot 410. The right eye 508 of the second viewer is capable of perceiving a vertical column (or line) of pixels 516 through the first vertical slot 406, a vertical column (or line) of pixels 518 through the second vertical slot 408, and a vertical column of pixels 520 through the third vertical slot 410. In other words, lines of pixels 516, 518, 520 are aligned with the right eye of the second viewer and lines of pixels 510, 512, 514 are aligned with the left eye of the second viewer.

From a third viewing position 504, the left eye 522 of a third viewer is capable of perceiving a vertical column (or line) of pixels 526 through the first vertical slot 406, a vertical column (or line) of pixels 528 through the second vertical slot 408, and a vertical column of pixels 530 through the third vertical slot 410. The right eye 524 of the third viewer is capable of perceiving a vertical column (or line) of pixels 532 through the first vertical slot 406, a vertical column (or line) of pixels 534 through the second vertical slot 408, and a vertical column of pixels 536 through the third vertical slot 410. In other words, lines of pixels 532, 534, 536 are aligned with the right eye of the third viewer and lines of pixels 526, 528, 530 are aligned with the left eye of the third viewer.

As described in greater detail below, in an exemplary embodiment, for the viewer at the second viewing position 502, content designated for the right eye (or right channel) is displayed using the subset of pixels 516, 518, 520 of the display 400 that are viewable by the right eye 508 of the viewer while content designated for the left eye (or left channel) is concurrently displayed on the subset of pixels 510, 512, 514 of the display 400 that are viewable by the left eye 506 of the viewer. For the viewer at the third viewing position 504, content designated for the right eye (or right channel) is displayed using the subset of pixels 532, 534, 536 of the display 400 that are viewable by the right eye 524 of the viewer while content designated for the left eye (or left channel) is concurrently displayed on the subset of pixels 526, 528, 530 of the display 400 that are viewable by the left eye 522 of the viewer.

Referring again to FIG. 1, the user interface 108 and the communications interface 116 are cooperatively configured to enable a user to configure the display system 104 for presenting three-dimensional content, as described in greater detail below. In an exemplary embodiment, the communications interface 116 is configured to support wireless communications between the user interface 108 and the display system 104. In this regard, the user interface 108 may be realized as a remote control that includes circuitry and/or other components configured to transmit signals wirelessly, wherein the communications interface 116 includes circuitry and/or other components configured to receive signals transmitted by the user interface 108 in a conventional manner. In an exemplary embodiment, the user interface 108 includes a plurality of buttons or other mechanisms adapted to allow a viewer to control the signals transmitted by the user interface 108 and interact with the display system 104 in a conventional manner.

The processor 112 generally represents the hardware, firmware and/or software (or combinations thereof) suitably configured to present images and/or video based on the content received by the receiver system 102 to a viewer on the display 114. Additionally, the processor 112 is coupled to the communications interface 116 and is responsive to signals transmitted by the user interface 108 that are received by the communications interface 116, as will be appreciated in the art and described in greater detail below. The processor 112 may be implemented using any sort of microprocessor, microcontroller, digital signal processor or other logic capable of controlling the functionality and/or otherwise interacting with the pixels of the display 114 to present images on the display 114. Typically, the processor 112 may also be associated with a suitably configured memory, such as any sort of static, dynamic, flash or other memory capable of storing programming instructions and/or data for processing by processor 112. In various embodiments, processor 112 may be realized using a "system on chip" (SoC) implementation that incorporates a hybrid microcontroller with memory, an application specific integrated circuit (ASIC), or another suitable integrated hardware implementations.

It should be understood that FIG. 1 is a simplified representation of the system 100 for purposes of explanation and ease of description, and FIG. 1 is not intended to limit the application or scope of the subject matter in any way. In this regard, although FIG. 1 depicts the receiver system 102 and the display system 104 as discrete components, it should be appreciated that in some practical embodiments, the receiver system 102 and the display system 104 may be realized as an integrated product (e.g., a conventional television) or the receiver system 102 and the processor 112 may be realized as an integrated product (e.g., a set-top box). In practice, the system 100 may include numerous other devices and components for providing additional functions and features, as will be appreciated in the art. For the sake of brevity, conventional techniques related to image processing, video processing, video encoding and/or decoding, stereoscopic imaging, and other functional aspects of the system 100 are not described in detail herein.

Figure 6:
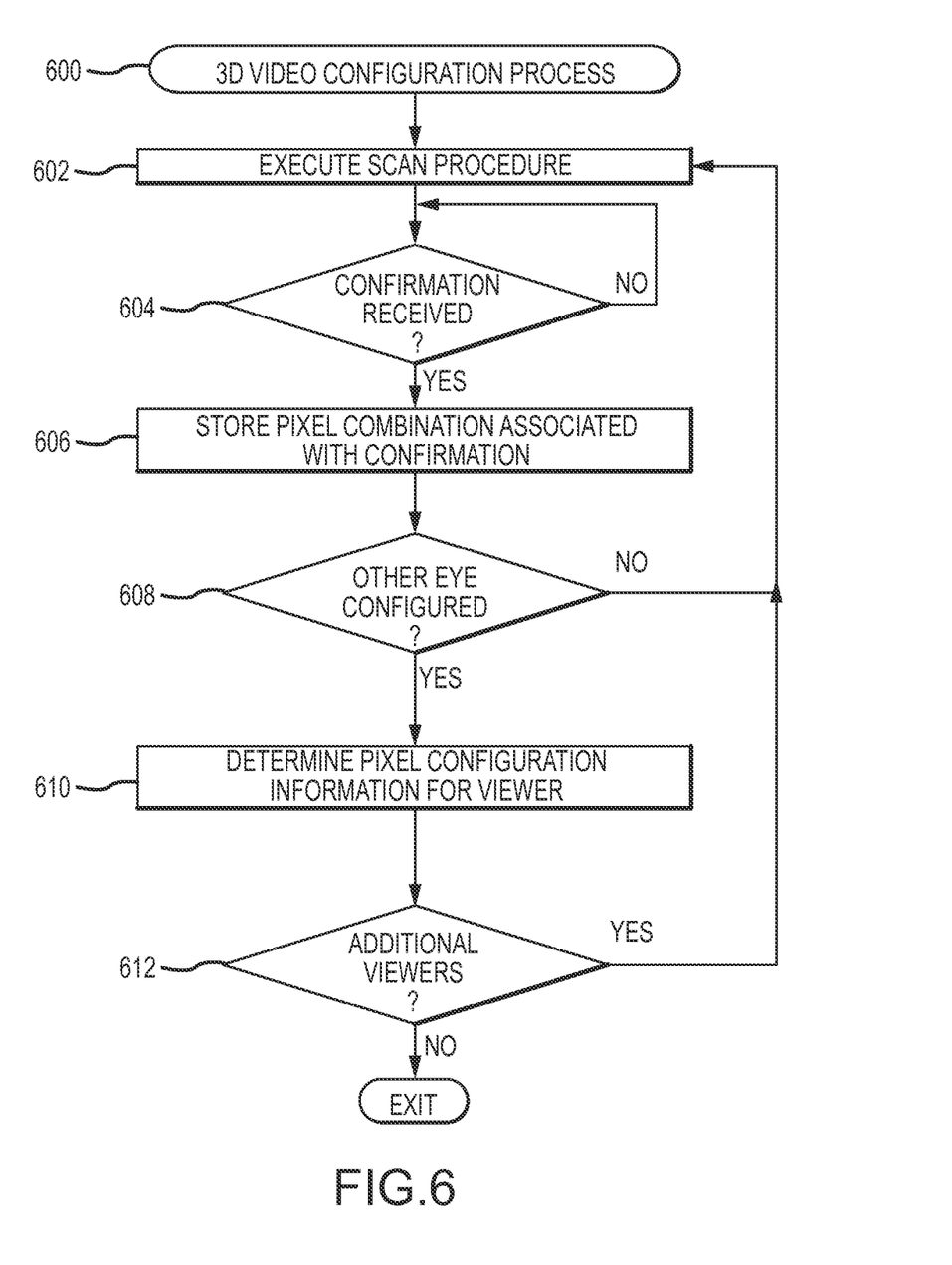
FIG. 6 is a flowchart of an exemplary three-dimensional video configuration process suitable for use with the system of FIG. 1.

Referring now to FIG. 6, in an exemplary embodiment, a system 100 may be configured to perform a three-dimensional video configuration process 600 and additional tasks, functions, and operations described below. The various tasks may be performed by software, hardware, firmware, or any combination thereof. For illustrative purposes, the following description may refer to elements mentioned above in connection with FIGS. 1-5. In practice, the tasks, functions, and operations may be performed by different elements of the described system, such as the display system 104, the user interface 108, the processor 112, the display 114 and/or the communications interface 116. It should be appreciated that any number of additional or alternative tasks may be included, and may be incorporated into a more comprehensive procedure or process having additional functionality not described in detail herein.

In an exemplary embodiment, the three-dimensional video configuration process 600 begins by executing a configuration scan procedure for a first eye of a first viewer (task 602). In this regard, the configuration scan procedure comprises a sequence of patterns or combinations of pixels of the display that are capable of being utilized to identify the subset of pixels of the display that are viewable by an eye (e.g., the left eye or the right eye) of the viewer from his or her current viewing position. For example, in an exemplary embodiment, the configuration scan procedure comprises a sequence of patterns or combinations of pixels presented on the display 114 that is viewed by a viewer using only one eye. As described in greater detail below, in accordance with one embodiment, during execution of the configuration scan procedure, when a viewer perceives the display 114 as being at its brightest through one eye (e.g., the right eye), the viewer provides confirmation to the display system 104 via the user interface 108. In response to receiving confirmation, the display system 104 and/or processor 112 stores or otherwise maintains the pattern or combination of pixels presented on the display 114 at the time the confirmation was received (tasks 604, 606). The three-dimensional video configuration process 600 then repeats the configuration scan procedure for the second eye (e.g., the left eye) of the viewer (tasks 602, 608). During execution of the configuration scan procedure, when a viewer perceives the display 114 as being at its brightest through the other eye (e.g., the left eye), the viewer provides confirmation to the display system 104 via the user interface 108. In response to receiving confirmation, the display system 104 and/or processor 112 stores or otherwise maintains the pattern or combination of pixels presented on the display 114 at the time the confirmation was received (tasks 604, 606).

In an exemplary embodiment, the processor 112 determines pixel configuration information for the viewer based on state of the display 114 when the confirmations from the user were received (task 610). In this regard, the pixel configuration information for a viewer comprises a first subset of pixels of the display 114 that are aligned with a right eye of the viewer and will be used to present right channel content and a second subset of pixels that are aligned with a left eye of the viewer and will be used to present left channel content. As described in greater detail below, in an exemplary embodiment, the processor 112 determines the subset of pixels of the display 114 that are aligned with the right eye of the viewer based on the pattern or combination of pixels presented on the display 114 at the time the confirmation was received when the viewer is viewing the display with only his or her right eye, and the processor 112 determines the subset of pixels of the display 114 that are aligned with the left eye of the viewer based on the pattern or combination of pixels presented on the display 114 at the time the confirmation was received when the viewer is viewing the display with only his or her left eye. After determining pixel configuration information for the viewer, the three-dimensional video configuration process 600 may be repeated for any additional viewers (tasks 610, 612). As described in greater detail below in the context of FIG. 7, each viewer's pixel configuration information is used to present three-dimensional content to the respective viewer.

Referring again to FIG. 6, and with continued reference to FIGS. 1-5, the three-dimensional video configuration process 600 may be performed to configure the display system 104 for presenting three-dimensional video to one or more viewers on the display 114. The three-dimensional video configuration process 600 may begin or otherwise initialize in response to a viewer indicating a desire to view three-dimensional content, for example, by using user interface 108 to select three-dimensional content (e.g., a three-dimensional content channel) or otherwise manipulating the user interface 108 to indicate a desire to configure the display system 104 for three-dimensional operation. In an exemplary embodiment, prior to executing a configuration scan procedure, the processor 112 may notify a first viewer to view the display 114 using only a first eye (e.g., by covering and/or closing the other eye) and instruct the viewer when to provide confirmation. For example, the processor 112 may provide instructions to the viewer on the display 114 that instruct the viewer to view the display 114 with a first eye (e.g., the right eye) and provide confirmation using the user interface 108 when the display 114 is perceived to be at its brightest during execution of the configuration scan procedure.

In accordance with one embodiment, when the aperture arrangement 106 comprises a plurality of vertical slots, the processor 112 executes the configuration scan procedure by sequentially presenting different patterns or combinations of vertical columns (or lines) of pixels on the display 114. In various embodiments, processor 112 may sequentially illuminate or otherwise activate the different patterns or combinations of pixels of the display 114 (task 602). For example, different vertical columns of pixels may be sequentially activated until one or more columns that best aligns with the viewer's eye is identified. It will be appreciated that display 114 will appear brightest when the pattern or combination of pixels bests aligns with the viewer's eye, at which point, the user provides confirmation via the user interface 108 as described in greater detail below. In some embodiments, the processor 112 may execute the configuration scan procedure by sequentially presenting every possible combination of vertical columns of pixels on the display 114. For example, in the embodiment of FIG. 4, the processor 112 may illuminate or otherwise activate different combinations of the vertical columns of pixels 414. In other embodiments, the processor 112 may present vertical stripes (or another pattern) and vary the location of the stripes (or pattern) across the display 114 until the viewer indicates the stripes (or pattern) are brightest or clearest. It should be understood that in practice, the configuration scan procedure may vary depending on the particular characteristics of the aperture arrangement and the needs of a particular application, and the subject matter described herein is not intended to be limited to any particular configuration scan procedure.

In response to receiving confirmation from the viewer, in an exemplary embodiment, the processor 112 stores or otherwise maintains the pattern or combination of pixels corresponding to the state of the display 114 during the configuration scan procedure at the time the confirmation is received as the subset of the pixels of the display 114 that are viewable by the first eye (e.g., the right eye) of the viewer through the aperture arrangement 106 (tasks 604, 606). For example, in the embodiment of FIG. 4, a viewer viewing the display 400 through his or her right eye from viewing position 402 may provide confirmation when the processor 112 illuminates or otherwise activates vertical columns 426, 428, 430 of pixels 414 on the display 400 during the configuration scan procedure, wherein the processor 112 stores or otherwise maintains the vertical columns 426, 428, 430 of pixels 414 as the subset of the pixels 414 of the display 400 aligned with the right eye of the first viewer.

As described above, the processor 112 continues by determining whether the configuration scan procedure has been performed for the other eye of the viewer, and in response to determining the other eye of the viewer has not been configured, the processor 112 instructs the viewer to view the display 114 using the other eye (e.g., the left eye) and provide confirmation using the user interface 108 when the display 114 is perceived to be at its brightest. The processor 112 repeats the configuration scan procedure for the second eye, and in response to receiving confirmation from the viewer, in an exemplary embodiment, the processor 112 stores or otherwise maintains the pattern or combination of pixels corresponding to the state of the display 114 during the configuration scan procedure at the time the confirmation as the subset of the pixels of the display 114 that are viewable by the second eye (e.g., the left eye) of the viewer through the aperture arrangement 106 (tasks 602, 604, 606). For example, in the embodiment of FIG. 4, a viewer viewing the display 400 through his or her left eye from viewing position 402 may provide confirmation when the processor 112 illuminates or otherwise activates vertical columns 420, 422, 424 of pixels 414 on the display 400 during the configuration scan procedure, wherein the processor 112 stores or otherwise maintains the vertical columns 420, 422, 424 of pixels 414 as the subset of the pixels 414 of the display 400 corresponding to the left eye of the first viewer.

In an exemplary embodiment, the processor 112 determines pixel configuration information for the first viewer based on the pixel combinations associated with the confirmations received from the first viewer (task 610). In this regard, the processor 112 determines the subset of pixels of the display 114 that are aligned with the right eye of the viewer based on the pattern or combination of pixels presented on the display 114 at the time the confirmation was received when the viewer is viewing the display with only his or her right eye and associates the subset of pixels aligned with the viewer's right eye with the right channel content. The processor 112 determines the subset of pixels of the display 114 that are aligned with the left eye of the viewer based on the pattern or combination of pixels presented on the display 114 at the time the confirmation was received when the viewer is viewing the display with only his or her left eye and associates the subset of pixels aligned with the viewer's left eye with the left channel content. For example, in the embodiment of FIG. 4, the processor 112 may determine pixel configuration information for a first viewer in viewing position 402 by designating or otherwise associating vertical columns 426, 428, 430 of pixels 414 with the right channel content and designating or otherwise associating vertical columns 420, 422, 424 of pixels 414 with the left channel content. In an exemplary embodiment, to ensure three-dimensional capability, the processor 112 verifies that the subset of pixels aligned with the right eye and the subset of pixels aligned with the left eye are mutually exclusive. In this regard, in the event there is any overlap between the subset of pixels aligned with the right eye and the subset of pixels aligned with the left eye, the processor 112 determines pixel configuration information for the viewer by removing the common pixels from the subsets of pixels.

As described above, the number and/or dimensions of apertures relative to the total number of pixels of the display 114 may be varied such that the subsets of pixels aligned with each eye may comprise a greater or lesser percentage of the total number of pixels of the display 114. In this regard, a greater number of pixels that are aligned with each eye of a viewer (e.g., a greater number of pixels contained in each subset of pixels) allows content to be presented to the viewer with higher-resolution and provides increased tolerance with respect to the viewing position of the viewer. For example, by adjusting the number and/or dimensions of the vertical slots in aperture arrangement 106 relative to the total number of vertical columns (or lines) pixels of the display 114 to increase the number of pixels in each subset of pixels would allow higher resolution images to be presented to the viewer and provide greater tolerance for lateral (or horizontal) movement of the viewer's head during viewing. However, adjusting the number and/or dimensions of apertures relative to the total number of pixels of the display 114 to increase number of pixels in each subset of pixels will limit the number of possible viewers that may be accommodated and/or otherwise limit the resolution when additional viewers are added, because it will increase the amount of pixels viewable by each user, thereby limiting the number of pixels contained in mutually exclusive subsets of pixels, as described in greater detail below.

Still referring to FIG. 6, and with continued reference to FIGS. 1-5, as described above, in an exemplary embodiment, the three-dimensional video configuration process 600 repeats the loop defined by tasks 602, 604, 606, 608 and 610 for each additional viewer. In this regard, after determining the pixel configuration information for a first viewer, the first viewer may indicate (e.g., via user interface 108) a desire to configure the display system 104 for one or more additional viewers. In response, the processor 112 executes a configuration scan procedure for the eyes of each additional viewer and determines pixel configuration information for each additional viewer until pixel configuration information for each viewer has been obtained.

For example, in the embodiment of FIG. 5, a viewer viewing the display 400 through his or her right eye 508 from viewing position 502 may provide confirmation when the processor 112 illuminates or otherwise activates vertical columns 516, 518, 520 of pixels 414 on the display 400 during the configuration scan procedure, wherein the processor 112 stores or otherwise maintains the vertical columns 516, 518, 520 of pixels 414 as the subset of the pixels 414 of the display 400 corresponding to or otherwise aligned with the right eye of the second viewer. Similarly, the viewer viewing the display 400 through his or her left eye 506 from viewing position 502 may provide confirmation when the processor 112 illuminates or otherwise activates vertical columns 510, 512, 514 of pixels 414 on the display 400 during the configuration scan procedure, wherein the processor 112 stores or otherwise maintains the vertical columns 510, 512, 514 of pixels 414 as the subset of the pixels 414 of the display 400 corresponding to or otherwise aligned with the left eye of the second viewer. The processor 112 may determine pixel configuration information for the second viewer in viewing position 502 by designating or otherwise associating vertical columns 516, 518, 520 of pixels 414 with the right channel content and designating or otherwise associating vertical columns 510, 512, 514 of pixels 414 with the left channel content.

As described above, in an exemplary embodiment, to ensure three-dimensional capability, the processor 112 verifies that the subset of pixels aligned with the right eye of the second viewer and the subset of pixels aligned with the left eye of the second viewer are mutually exclusive. Additionally, the processor 112 verifies that the subsets of pixels for the first viewer and the subsets of pixels for the second viewer are mutually exclusive. In this regard, in the event there is any overlap between a subset of pixels aligned with an eye of the first viewer and a subset of pixels aligned with an eye of the second viewer, the processor 112 determines pixel configuration information for the viewers by removing the common pixels from the subsets of pixels. This ensures appropriate mapping of the right channel content and the left channel content to the display, such that each viewer will accurately perceive right channel content presented on the display with his or her right eye and left channel content presented on the display with his or her left eye.

In a similar manner as described above, a third viewer viewing the display 400 through his or her right eye 524 from viewing position 504 may provide confirmation when the processor 112 illuminates or otherwise activates vertical columns 532, 534, 536 of pixels 414 on the display 400 during the configuration scan procedure, wherein the processor 112 stores or otherwise maintains the vertical columns 532, 534, 536 of pixels 414 as the subset of the pixels 414 of the display 400 corresponding to or otherwise aligned with the right eye of a third viewer. The viewer viewing the display 400 through his or her left eye 522 from viewing position 504 may provide confirmation when the processor 112 illuminates or otherwise activates vertical columns 526, 528, 530 of pixels 414 on the display 400 during the configuration scan procedure, wherein the processor 112 stores or otherwise maintains the vertical columns 526, 528, 530 of pixels 414 as the subset of the pixels 414 of the display 400 corresponding to or otherwise aligned with the left eye of the third viewer. The processor 112 may determine pixel configuration information for the third viewer in viewing position 504 by designating or otherwise associating vertical columns 532, 534, 536 of pixels 414 with the right channel content and designating or otherwise associating vertical columns 526, 528, 530 of pixels 414 with the left channel content.

Figure 7:
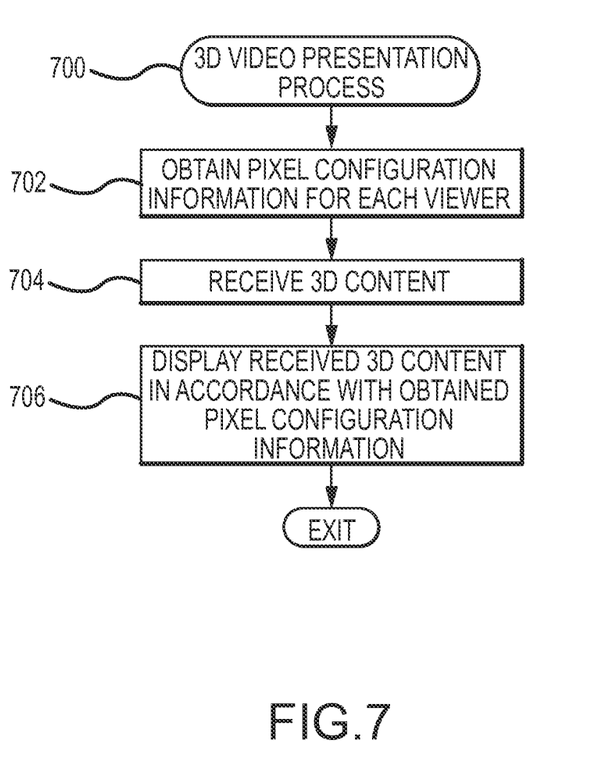
FIG. 7 is a flowchart of an exemplary three-dimensional video presentation process suitable for use with the system of FIG. 1.

Referring now to FIG. 7, in an exemplary embodiment, a system 100 may be configured to perform a three-dimensional video presentation process 700 and additional tasks, functions, and operations described below. The various tasks may be performed by software, hardware, firmware, or any combination thereof. For illustrative purposes, the following description may refer to elements mentioned above in connection with FIGS. 1-5. In practice, the tasks, functions, and operations may be performed by different elements of the described system, such as the receiver system 102, the display system 104, the user interface 108, the processor 112 and/or the display 114. It should be appreciated that any number of additional or alternative tasks may be included, and may be incorporated into a more comprehensive procedure or process having additional functionality not described in detail herein.

In an exemplary embodiment, the three-dimensional video presentation process 700 begins by obtaining pixel configuration information for each viewer (task 702). As described above, the pixel configuration information for a viewer comprises a first subset of pixels of the display 114 that will be used to present right channel content and a second subset of pixels that will be used to present left channel content. In this regard, for each viewer, the processor 112 obtains or otherwise identifies the subset of pixels of the display 114 that correspond to the right eye of the respective viewer and the subset of pixels of the display 114 that correspond to the left eye of the respective viewer. In an exemplary embodiment, the processor 112 obtains the pixel configuration information for each viewer by performing a three-dimensional video configuration process 600, as described above. In alternative embodiments, the pixel configuration information for one or more viewing positions may be preconfigured stored or otherwise maintained by processor 112 from a previous configuration process, in which case, the processor 112 identify the pixel configuration information for each viewer in response to the respective viewer selecting his or her viewing position from a list of preconfigured viewing positions.

In an exemplary embodiment, the three-dimensional video presentation process 700 continues by receiving three-dimensional content for display (task 704). In this regard, the processor 112 receives three-dimensional content from the content source 110 via receiver system 102 in a conventional manner. In an exemplary embodiment, the processor 112 receives three-dimensional video content comprising a first plurality of video frames encoded or otherwise designated for a right channel (or right eye of a prospective viewer) and a second plurality of video frames encoded or otherwise designated for a left channel (or left eye of a prospective viewer).

In an exemplary embodiment, the three-dimensional video presentation process 700 continues by displaying the received content in accordance with the obtained pixel configuration information for the viewer(s) (task 706). In an exemplary embodiment, the processor 112 uses the pixel configuration information for the viewer(s) to map the received content to the appropriate pixels on the display 114. For example, the processor 112 maps the right channel content onto the appropriate pixels of the display 114 by displaying or otherwise rendering, for each viewer, the right channel content using the subset of pixels of the display 114 that are aligned with the right eye of the respective viewer. Similarly, the processor 112 maps the left channel content on the appropriate pixels of the display 114 by displaying or otherwise rendering, for each viewer, the left channel content using the subset of pixels of the display 114 that are aligned with the left eye of the respective viewer. In this regard, the processor 112 maps each right channel frame onto the subset of pixels of the display 114 that are viewable by the right eye of each viewer from his or her viewing position and maps each left channel frame onto the subset of pixels of the display 114 that are viewable by the left eye of each viewer from his or her viewing position. In this manner, the right channel content (or right channel frames) may be concurrently displayed and/or mapped onto each subset of pixels aligned with a right eye of a respective viewer and the left channel content (or left channel frames) may be concurrently displayed and/or mapped onto each subset of pixels aligned with a left eye of a respective viewer. Thus, the right channel content is viewable or otherwise perceived by the right eye of each respective viewer, and the left channel content is viewable or otherwise perceived by the left eye of each respective viewer to achieve a stereoscopic effect for each viewer.

For example, in the illustrated embodiment of FIG. 4, the processor 112 displays or otherwise renders each frame encoded or otherwise designated for the right channel using the vertical columns 426, 428, 430 of pixels 414, and the processor 112 displays or otherwise renders each frame encoded or otherwise designated for the left channel using the vertical columns 420, 422, 424 of pixels 414. In other words, the processor 112 allocates vertical columns 426, 428, 430 of pixels 414 to the right channel content and vertical columns 420, 422, 424 of pixels 414 to the left channel content. Referring now to FIG. 5, for an additional viewer at viewing position 502, the processor 112 displays or otherwise renders each frame encoded or otherwise designated for the right channel using the vertical columns 516, 518, 520 of pixels 414, and the processor 112 displays or otherwise renders each frame encoded or otherwise designated for the left channel using the vertical columns 510, 512, 514 of pixels 414. In other words, for the second viewer, the processor 112 allocates vertical columns 516, 518, 520 of pixels 414 to the right channel content and vertical columns 510, 512, 514 of pixels 414 to the left channel content. Similarly, for a third viewer at viewing position 504, the processor 112 displays or otherwise renders each frame encoded or otherwise designated for the right channel using the vertical columns 532, 534, 536 of pixels 414, and the processor 112 displays or otherwise renders each frame encoded or otherwise designated for the left channel using the vertical columns 526, 528, 530 of pixels 414. In other words, for the third viewer, the processor 112 allocates vertical columns 532, 534, 536 of pixels 414 to the right channel content and vertical columns 526, 528, 530 of pixels 414 to the left channel content.

By virtue of each eye of each prospective viewer perceiving a unique (or mutually exclusive) subset of the pixels of the display 114, each viewer may be presented with different three-dimensional content. For example, referring again to FIG. 5, right channel frames of from a first content source may be presented on vertical columns 426, 428, 430 of pixels 414 and left channel frames from the first content source may be presented on vertical columns 420, 422, 424 of pixels 414 to the present a first type of three-dimensional content to a first viewer in viewing position 402. Right channel frames of from a second content source may be presented on vertical columns 516, 518, 520 of pixels 414 and left channel frames from the second content source may be presented on vertical columns 510, 512, 514 of pixels 414 to the present a second type of three-dimensional content to a second viewer in viewing position 502. Right channel frames of from a third content source may be presented on vertical columns 532, 534, 536 of pixels 414 and left channel frames from the third content source may be presented on vertical columns 526, 528, 530 of pixels 414 to the present a third type of three-dimensional content to a third viewer in viewing position 504. Thus, the viewers may view different three-dimensional content (e.g., different three-dimensional content channels) on the display 114 at the same time.

One advantage of the systems and/or methods described above is that three-dimensional video and/or images may be presented to one or more viewers without need to use glasses or other objects that need to be worn and/or maintained by a viewer. Depending on the number of pixels of the display and the particular configuration of the apertures of the aperture arrangement, a single aperture arrangement such as those described herein may allow presentation of three-dimensional video and/or images to any number of viewers with any level of resolution. Additionally, the viewers may be presented with the same three-dimensional video and/or images concurrently, or each viewer may be presented with three-dimensional video and/or images that are independent of the three-dimensional video and/or images being presented to another viewer.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations. Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the following description for the purpose of reference only, and thus are not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system to present three-dimensional video content to a viewer, the system comprising:
 a display comprising a plurality of pixels;
 an aperture arrangement interposed in a line-of-sight between the display and the viewer, the aperture arrangement comprising a plurality of apertures, the plurality of apertures comprising a plurality of physical openings in an opaque material; and
 a processor coupled to the display, wherein the processor and the display are cooperatively configured to:
  determine a first subset of the plurality of pixels that are viewable by a right eye of the viewer through the aperture arrangement by executing a first configuration scan procedure, the first configuration scan procedure comprising a first sequence of different combinations of columns of pixels activated on the display and viewed by the viewer using only the right eye;
  determine a second subset of the plurality of pixels that are viewable by a left eye of the viewer through the aperture arrangement by executing a second configuration scan procedure, the second configuration scan procedure comprising a second sequence of different combinations of columns of pixels activated on the display and viewed by the viewer using only the left eye, wherein the first subset and the second subset are mutually exclusive;
  display right channel content on the first subset of the plurality of pixels; and
  display left channel content on the second subset of the plurality of pixels.

2. The system of claim 1, wherein the processor is configured to:
 receive a confirmation from the viewer during execution of the first configuration scan procedure; and
 determine the first subset of pixels based on a state of the display during execution of the first configuration scan procedure when the confirmation is received.

3. The system of claim 2, wherein the processor is configured to:
 receive a second confirmation from the viewer during execution of the second configuration scan procedure; and
 determine the second subset of pixels based on a state of the display during execution of the second configuration scan procedure when the second confirmation is received.

4. The system of claim 3, wherein the processor is configured to:
 instruct the viewer to view the display with the right eye during execution of the first configuration scan procedure; and
 instruct the viewer to view the display with the left eye during execution of the second configuration scan procedure.

5. The system of claim 3, wherein the processor is configured to verify the first subset of pixels and the second subset of pixels are mutually exclusive.

6. A system to present three-dimensional video content comprising a first plurality of frames corresponding to a first eye and a second plurality of frames corresponding to a second eye, the system comprising:
 a display comprising a plurality of pixels;
 an aperture arrangement disposed proximate the display, the aperture arrangement comprising a plurality of physical openings in an opaque material; and
 a processor coupled to the display, wherein the processor is configured to:
  execute a first configuration scan procedure for the first eye by sequentially activating different combinations of columns of the plurality of pixels of the display;
  determine a first subset of the plurality of pixels that are aligned with the first eye through the aperture arrangement based on a state of the display during execution of the first configuration scan procedure when a first confirmation is received;
  execute a second configuration scan procedure for the second eye by sequentially activating different combinations of columns of the plurality of pixels of the display;
  determine a second subset of the plurality of pixels that are aligned with the second eye through the aperture arrangement based on a state of the display during execution of the second configuration scan procedure when a second confirmation is received, wherein the second subset and the first subset are mutually exclusive;
  display the first plurality of frames on the first subset of pixels; and
  display the second plurality of frames on the second subset of pixels.

7. The system of claim 6, further comprising a user interface communicatively coupled to the processor, the user interface being configured to provide the first confirmation and the second confirmation from a viewer to the processor, wherein:
- the aperture arrangement is interposed in a line-of-sight between the viewer and the display; and
- the processor is configured to:
  - instruct the viewer to view the display with the first eye during execution of the first configuration scan procedure; and
  - instruct the viewer to view the display with the first eye during execution of the second configuration scan procedure.

8. The system of claim 6, the first subset of pixels being aligned with the first eye through the aperture arrangement from a first viewing position and the second subset of the plurality of pixels being aligned with the second eye from the first viewing position, wherein the processor is configured to:
- determine a third subset of the plurality of pixels that are aligned with the first eye through the aperture arrangement from a second viewing position;
- determine a fourth subset of the plurality of pixels that are aligned with the second eye through the aperture arrangement from the second viewing position;
- display the first plurality of frames on the first and third subsets of pixels concurrently; and
- display the second plurality of frames on the second and fourth subsets of pixels concurrently.

9. A method to present three-dimensional video content comprising a first plurality of frames corresponding to a first channel and a second plurality of frames corresponding to a second channel, the method comprising:
- executing a first configuration scan procedure comprising a first sequence of different combinations of columns of pixels activated on a display;
- identifying a first subset of pixels of the display that are aligned with a first eye of a viewer through an aperture arrangement based on a state of the display during execution of the first configuration scan procedure when a first confirmation is received from the viewer, wherein the aperture arrangement comprises a plurality of physical openings in an opaque material;
- executing a second configuration scan procedure comprising a second sequence of different combinations of columns of pixels activated on the display;
- identifying a second subset of pixels of the display that are aligned with a second eye of the viewer through the aperture arrangement based on a state of the display during execution of the second configuration scan procedure when a second confirmation is received from the viewer, wherein the first subset and the second subset are mutually exclusive;
- displaying the first plurality of frames on the first subset of pixels; and
- displaying the second plurality of frames on the second subset of pixels.

10. The method of claim 9, further comprising instructing the viewer to view the display with the first eye during execution of the first configuration scan procedure.

11. The method of claim 10, wherein:
- executing the first configuration scan procedure comprises sequentially activating the different combinations of columns of pixels of the display; and
- instructing the viewer comprises instructing the viewer to provide the confirmation when the display appears brightest.

12. The method of claim 9, wherein executing the first configuration scan procedure comprises sequentially activating the different combinations of columns of pixels of the display.

13. The method of claim 9, wherein:
- displaying the first plurality of frames comprises, for each frame of the first plurality of frames, mapping the respective frame onto the first subset of pixels; and
- displaying the second plurality of frames comprises, for each frame of the second plurality of frames, mapping the respective frame onto the second subset of pixels.

14. The method of claim 9, the first plurality of frames corresponding to a right channel and the second plurality of frames corresponding to a left channel, the first subset of pixels being aligned with a right eye of the viewer and the second subset of pixels being aligned with a left eye of the viewer, wherein the method further comprises:
- identifying a third subset of pixels of the display that are aligned with a right eye of a second viewer through the aperture arrangement;
- identifying a fourth subset of pixels of the display that are aligned with a left eye of the second viewer through the aperture arrangement;
- concurrently displaying the first plurality of frames on the first and third subsets of pixels; and
- concurrently displaying the second plurality of frames on the second and fourth subsets of pixels.

15. The method of claim 9, the first and second plurality of frames corresponding to first content, wherein the method further comprises:
- identifying a third subset of pixels of the display that are aligned with a right eye of a second viewer through the aperture arrangement;
- identifying a fourth subset of pixels of the display that are aligned with a left eye of the second viewer through the aperture arrangement;
- displaying a third plurality of frames corresponding to a right channel of second content on the third subset of pixels; and
- displaying a fourth plurality of frames corresponding to a left channel of the second content on the fourth subset of pixels.

16. The method of claim 15, wherein the first subset, the second subset, the third subset, and the fourth subset are mutually exclusive.

17. The system of claim 1, wherein the processor is configured to remove common pixels from the first subset and the second subset if the first subset and the second subset overlap.

18. The system of claim 1, wherein the processor is configured to:
- provide, on the display, instructions to the viewer to view the display with the right eye during execution of the first configuration scan procedure and provide confirmation using a user interface when the display is perceived to be at its brightest during execution of the first configuration scan procedure;
- sequentially activate different combinations of columns of the plurality of pixels of the display during execution of the first configuration scan procedure;
- receive a first confirmation from the viewer via the user interface during execution of the first configuration scan procedure;
- maintain, as the first subset of pixels, a first combination of columns of the plurality of pixels corresponding to a first state of the display during execution of the first configuration scan procedure when the first confirmation is received;

provide, on the display, instructions to the viewer to view the display with the left eye during execution of the second configuration scan procedure and provide confirmation using the user interface when the display is perceived to be at its brightest during execution of the second configuration scan procedure;

sequentially activate different combinations of columns of the plurality of pixels of the display during execution of the second configuration scan procedure;

receive a second confirmation from the viewer via the user interface during execution of the second configuration scan procedure; and maintain, as the second subset of pixels, a second combination of columns of the plurality of pixels corresponding to a second state of the display during execution of the second configuration scan procedure when the second confirmation is received.

19. The system of claim 1, wherein the processor is configured to:

determine a third subset of the plurality of pixels that are viewable by a right eye of a second viewer through the aperture arrangement by executing a third configuration scan procedure, the third configuration scan procedure comprising a third sequence of different combinations of columns of pixels activated on the display and viewed by the second viewer using only the right eye;

determine a fourth subset of the plurality of pixels that are viewable by a left eye of the second viewer through the aperture arrangement by executing a fourth configuration scan procedure, the fourth configuration scan procedure comprising a fourth sequence of different combinations of columns of pixels activated on the display and viewed by the second viewer using only the left eye, wherein the third subset and the fourth subset are mutually exclusive;

display the right channel content on the first subset of the plurality of pixels and the third subset of the plurality of pixels; and display the left channel content on the second subset of the plurality of pixels and the fourth subset of the plurality of pixels.

20. The system of claim 19, wherein the first subset, the second subset, the third subset, and the fourth subset are mutually exclusive.

\* \* \* \* \*